United States Patent
Sixta et al.

(10) Patent No.: US 11,486,094 B2
(45) Date of Patent: Nov. 1, 2022

(54) METHOD TO CONVERT MECHANICAL PULP DERIVED WASTE MATERIAL INTO VALUE ADDED CELLULOSE PRODUCTS

(71) Applicant: Aalto University Foundation sr, Aalto (FI)

(72) Inventors: Herbert Sixta, Aalto (FI); Yibo Ma, Aalto (FI); Michael Hummel, Aalto (FI)

(73) Assignee: Aalto University Foundation sr, Aalto (FI)

( * ) Notice: Subject to any disclaimer, the term of this patent is extended or adjusted under 35 U.S.C. 154(b) by 531 days.

(21) Appl. No.: 16/480,315

(22) PCT Filed: Feb. 1, 2018

(86) PCT No.: PCT/FI2018/050071
§ 371 (c)(1),
(2) Date: Jul. 24, 2019

(87) PCT Pub. No.: WO2018/142025
PCT Pub. Date: Aug. 9, 2018

(65) Prior Publication Data
US 2019/0376236 A1    Dec. 12, 2019

(30) Foreign Application Priority Data
Feb. 1, 2017  (FI) ...................... 20175085

(51) Int. Cl.
*D21H 13/08*    (2006.01)
*D21C 9/00*    (2006.01)
(Continued)

(52) U.S. Cl.
CPC ............. *D21H 13/08* (2013.01); *D21C 3/003* (2013.01); *D21C 3/222* (2013.01); *D21C 9/004* (2013.01); *D21C 9/005* (2013.01)

(58) Field of Classification Search
CPC ........ D21H 13/08; D21C 9/004; D21C 9/005; D21C 3/003
See application file for complete search history.

(56) References Cited

U.S. PATENT DOCUMENTS 1,735,013 A * 11/1929 Richter .................. D21C 3/222
 162/77
4,135,967 A * 1/1979 Fogarassy ................ D21C 3/20
 162/29

(Continued)

FOREIGN PATENT DOCUMENTS

CN    101605817 A    12/2009
CN    105392929 A    3/2016
(Continued)

OTHER PUBLICATIONS

H-Factor calculator, https://www.knowpulp.com/www_demo_version/english/pulping/cooking/1_process/1_principle/h-tekijan_laskenta.htm,2021 (Year: 2021).*

(Continued)

*Primary Examiner* — Anthony Calandra
(74) *Attorney, Agent, or Firm* — Laine IP Oy

(57) ABSTRACT

According to an example aspect of the present invention, there is provided a process for the conversion of cellulosic waste material into a recycled cellulose product comprising the steps of cooking the waste material in a cooking liquor to remove lignin from the waste material and provide a delignified pulp, dissolving the delignified pulp in an ionic liquid to provide a spinning dope suitable for dry jet-wet spinning in an ionic liquid solution, and subjecting the spinning dope to a further processing step to provide a recycled cellulose product, said further step selected from the group of spinning cellulose fibers for use in textiles from the solution, extruding a film product for use in packaging, (Continued)

regenerating the dope as a hydrogel and regenerating the dope as an aerogel.

14 Claims, 5 Drawing Sheets

(51) Int. Cl.
*D21C 3/00* (2006.01)
*D21C 3/22* (2006.01)

(56) References Cited

U.S. PATENT DOCUMENTS

| | | | |
|---|---|---|---|
| 2010/0129452 A1 | 5/2010 | Ito et al. | |
| 2011/0220307 A1* | 9/2011 | Duggirala | D21C 3/222 162/77 |
| 2015/0225901 A1* | 8/2015 | Asikainen | D21C 9/002 162/9 |
| 2017/0211231 A1* | 7/2017 | Baker | D21C 3/20 |

FOREIGN PATENT DOCUMENTS

| | | |
|---|---|---|
| CN | 105970325 A | 9/2016 |
| CN | 106149081 A | 11/2016 |
| WO | WO9607778 A1 | 3/1996 |
| WO | WO2014162062 A1 | 10/2014 |

OTHER PUBLICATIONS

Smook, Handbook for Pulp and Paper Technologists, 1992, Angus Wilde Publications, 2nd edition, chapter 9 (Year: 1992).*
Agarwal et al: Cellulose crystallinity of woods, wood pulps and agricultural fibers by FT-Raman spectroscopy. 16th ISWFPC, 2015, Vancouver, Canada, pp. 69-75.
Asaadi et al: Renewable high-performance fibers from the chemical recycling of cotton waste utilizing an ionic liquid. Chemsuschem, Nov. 23, 2016, vol. 9, No. 22, pp. 3250-3258, XP055469974.
Demirbas et al: Degradation of poplar and spruce wood chips using alkaline glycero. Energy Sources. Part A. Recovery, Utilization and Environmental EFF, Aug. 1, 2005, vol. 27, pp. 1073-1084. XP009151533.
Demirbas: Aqueous glycerol delignification of wood chips and ground wood. Bioresour. Technol., 1998, vol. 63, pp. 179-185.
Holik: Handbook of Paper and Board. 2006.
Hummel et al: Ionic liquids for the production of man-made cellulosic fibers—opportunities and challenges. Advances in Polymer Science, 2016, pp. 1-36.
Hundt et al: Alkaline polyol pulping and enzymatic hydrolysis of softwood: Effect of pulping severity and pulp properties on cellulase activity and overall sugar yield. Bioresour. Technol., 2013, vol. 134, pp. 307-315.
Hundt et al: Combining the effects of pulping severity and alkali concentration to optimize the lignocellulose-based AlkaPolP biorefinery concept. Bioresour. Technol., 2014, vol. 166, pp. 411-419.
Hundt et al: Lignocellulose feedstock biorefinery based on alkaline polyol pulping. Chem. Ing. Tech., 2013, vol. 85, pp. 758-763.
Hundt et al: The AlkaPolP process: Fractionation of various lignocelluloses and continuous pulping within an integrated biorefinery concept. Chem Eng. Res. Des., 2016, vol. 107, pp. 13-23.
Iakovlev et al: Efficient Fractionation of Spruce by SO2-Ethanol-Water Treatment: Closed Mass Balances for Carbohydrates and Sulfur. Chemsuschem, 2012, vol. 5, pp. 1625-1637.
Ma et al: Upcycling of waste paper and cardboard to textiles. Green Chem., 2016, vol. 18, pp. 858-866.
Michud et al: Influence of molar mass distribution on the final properties of fibers regenerated from cellulose dissolved in ionic liquid by dry-jet wet spinning. Polymer, 2015, vol. 75, pp. 1-9.
Michud et al: Ioncell-F: ionic liquid-based cellulosic textile fibers as an alternative to viscose and lyocell. Textile Research Journal, Jun. 16, 2015. vol. 86, No. 5, pp. 543-552. XP055470348.
Nieminen et al: Kinetic Model for Carbohydrate Degradation and Dissolution during Kraft Pulping. Ind. Eng. Chem. Res., 2014, vol. 53, pp. 11292-11302.
Sixta et al: Ioncell-F: a high-strength regenerated cellulose fiber. Nord. Pulp. Pap. Res. J., 2015, vol. 30, pp. 43-57.
Uraki et al: Polyhydric alcohol pulping at atmospheric pressure. An effective method for organosolv pulping of softwoods. Holzforschung, 1999, vol. 53, pp. 411-415.
Wise et al: Chlorite holocellulose, its fractionation and bearing on summative wood analysis and on studies on the hemicelluloses. Pap. Trade J., 1946, vol. 122, pp. 35-43.
Yamamoto et al: The effect of bark on sulfur dioxide-ethanol-water fractionation and enzymatic hydrolysis of forest biomass. Bioresour. Technol., 2014, vol. 167, pp. 390-397.
Yamamoto et al: The effect of chemical and physical characteristics of spruce SEW pulps on enzymatic hydrolysis. Cellulose, 2014, vol. 21, pp. 3395-3407.

* cited by examiner

METHOD TO CONVERT MECHANICAL PULP DERIVED WASTE MATERIAL INTO VALUE ADDED CELLULOSE PRODUCTS

FIELD

The present invention relates to a method of converting waste material derived from mechanical pulps into high value-added cellulose products including e.g. spun textile fibers, extruded films, hydrogels and aerogels.

BACKGROUND

The recycling rate of newspapers prepared from mechanical pulps (TMP, CTMP) has been reported to be 73% (Holik, 2006) in the CEPI countries. This figure shows that the recycling of newspaper is quite efficient, but the added value is still low. Also in the view of a declining newspaper market, alternative uses with a higher valorisation potential should be envisioned. The conversion into e.g. man-made cellulose fibers would result in an almost thirtyfold increase of the raw material value (100 € to 3000 €/t).

The use of waste paper for the production of regenerated cellulose fibers based on Lyocell spinning technology is known. For example, Firgo et al reported about the use of deinked waste paper in the NMMO process. However, even though the waste paper was from wood-free paper (lignin-free) the tenacity did not exceed 20 cN/tex which is hardly acceptable in the market (Firgo et al., 1996). Quite recently, the production of regenerated cellulose fibers made from pretreated fine paper with a lignin content of only 1.1% using the Ioncell-F process was reported (Ma et al., 2016). The mechanical properties of the produced fibers were 44.1 and 32.0 cN/tex in the conditioned and wet states, respectively, and thus meet the requirements of modern textile fibers.

Under aqueous alkaline conditions the cellulose DP is largely preserved provided that the temperature remains below 140° C. to avoid alkaline hydrolysis of cellulose (Nieminen et al., 2014). However, without any efficient nucleophile such as hydrogensulfide or sulfite anions an efficient delignification is not possible at low temperatures. Replacing water by an organic solvent for lignin promotes delignification and would allow the use of a higher temperature to enhance the efficiency of delignification while cellulose depolymerization can be kept at a moderate level. Demirbas and Celik proposed alkaline glycerol as an efficient delignification system. However, very high temperatures (>210° C.) and moderate delignification efficiencies were reported (Demirbas, 1998; Demirbas & Celik, 2005). Quite recently Hundt et al. demonstrated that the use of (almost) water-free glycerol in combination with potassium hydroxide in very high concentrations could remove the lignin from pine wood to very low levels (kappa numbers below 10) while cellulose remained largely preserved (Hundt et al., 2014; Hundt et al., 2013a; Hundt et al., 2013b). The obtained pulps were characterized only regarding their residual lignin content and their crystallinity index because the target was to convert the polysaccharides into monosugars by enzymatic treatment for subsequent fermentation. The cellulose DP or even the molecular weight distribution of the pulps were not determined.

This fractionation method seems to be attractive because glycerol is a cheap and green waste product of biodiesel production. One of the drawbacks for the commercialization of the process is the substantial amount of KOH charged to the solvent. An integrated lignocellulose biorefinery concept based on a continuous pulping process was recently published (Hundt et al., 2016) where the authors suggest the use of electrodialysis with bipolar membranes for the recycling of potassium hydroxide. The excess water in the glycerol (from washing) is removed by evaporation in a thin film evaporator. Still, a substantial improvement of the process conditions, thereby focusing on the reduction of the alkali charge and the replacement of KOH by NaOH, will be necessary to render the alkaline glycerol fractionation a commercially feasible process.

SUMMARY OF THE INVENTION

It is an aim of the present invention to overcome at least some of the disadvantages described above and provide a process for the conversion of cellulosic waste material derived from mechanical pulps into high value-added cellulose products. Regenerated cellulose fibers with excellent (textile) mechanical properties could be produced from old newspaper which has been pretreated by a novel, green fractionation process. These findings offer new possibilities for advanced recycling strategies using waste materials from everyday life of lowest quality and converting them into value added products such as textile fibers, highly transparent films for coating and packaging, membranes, battery separators, to name a few.

The invention is defined by the features of the independent claims. Some specific embodiments are defined in the dependent claims.

According to a first aspect of the present invention, there is provided a process for the conversion of cellulosic waste material into a recycled cellulose product comprising the steps of cooking the waste material to remove lignin from the waste material and provide a delignified pulp, dissolving the delignified pulp in an ionic liquid to provide a spinning dope suitable for dry jet-wet spinning in an ionic liquid solution, and subjecting the spinning dope to a further processing step to provide a recycled cellulose product, said further step selected from the group of spinning cellulose fibers for use in textiles from the solution extruding a film product for use in packaging, regenerating the dope as a hydrogel and regenerating the dope as an aerogel.

BRIEF DESCRIPTION OF THE DRAWINGS

Next preferred embodiments will be examined more closely with the aid of a detailed description and with reference to the attached drawings; in which.

EMBODIMENTS

By means of embodiments it has surprisingly been found that old untreated newspapers or deinked newspapers prepared from softwood TMP or CTMP pulps can be utilized as a raw material for Lyocell fiber production. Lowering the lignin content in these wood-like substrates with a chemical pretreatment ensures spinnability in a lyocell spinning process. The chemical pretreatment of newspapers, softwood TMP or CTMP pulps and related substrates can be achieved by an alkaline glycerol cooking process. For the first time regenerated cellulose fibers with excellent (textile) mechanical properties could be produced from old newspaper which has been pretreated by a novel, green fractionation process. These findings offer new possibilities for advanced recycling strategies using waste materials from everyday life of lowest quality and converting them into value added products such as textile fibers, highly transparent films for coating and packaging, membranes, battery separators, to name a few. In the present context, waste materials refers not only to post-consumer recyclable substrates such as newspaper and the like but also to pre-consumer substrates which are waste products generated in industrial processes such as off-cuts in the printing industry and other such paper and wood-like products.

Figure 1:
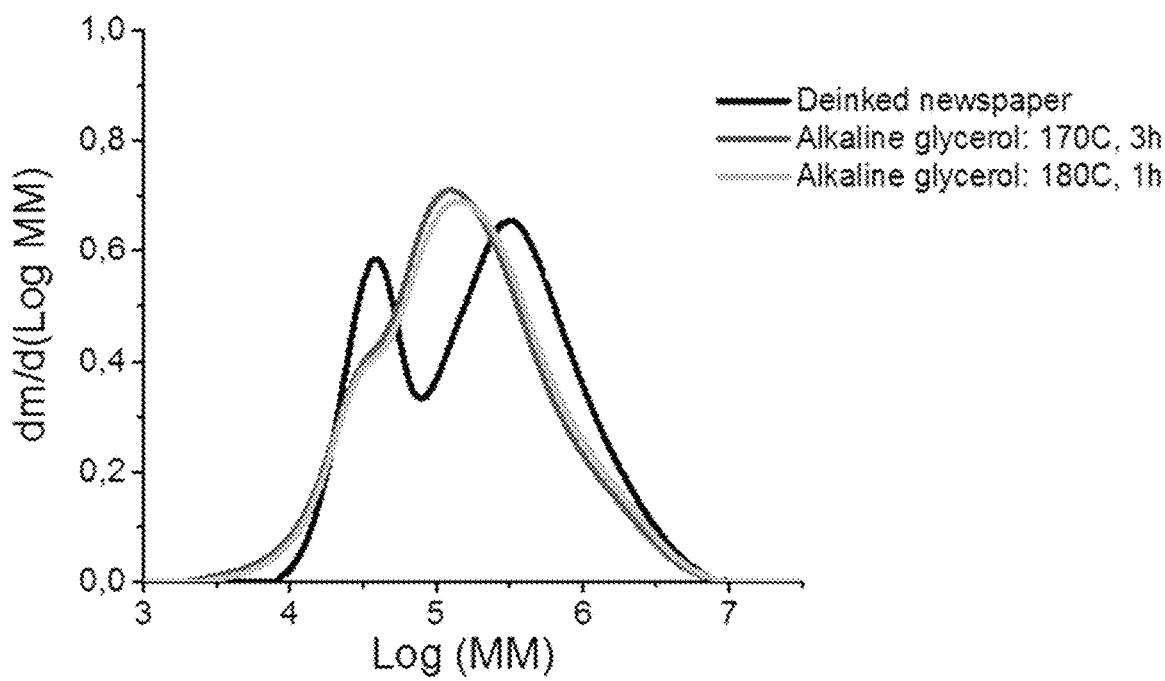
FIG. 1 is a graph showing MMD of deinked newspaper pretreated by alkaline glycerol cooking.

FIG. 1 is a graph showing MMD measured by GPC of deinked newspaper pretreated by alkaline glycerol cooking. The MMD of deinked newspaper is (474 kDa) compared with deinked newspaper cooked in alkaline glycerol at 170° C. for 3 hours (356 kDa) and deinked newspaper cooked in alkaline glycerol at 180° C. for 1 hour (395 kDa). As can be seen from the graph alkaline glycerol pulping proves to be very efficient and selective. The cellulose DP remains in an acceptable range while delignification reaches very high levels. The figure provides confirmation that molecular mass is preserved during alkaline glycerol pulping.

Figure 2:
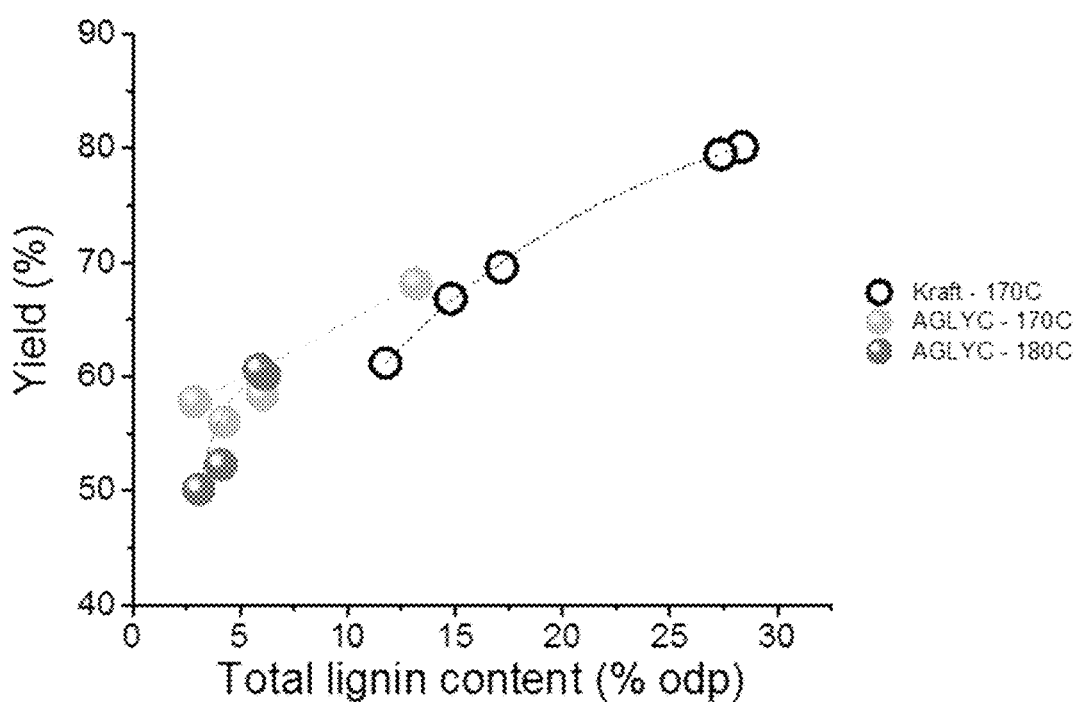
FIG. 2 is a graph in which yield is plotted against total lignin content (KL+ASL) of kraft and alkaline glycerol cooking of deinked newspaper.

FIG. 2 is a graph in which yield is plotted against total lignin content (KL+ASL) of kraft and alkaline glycerol cooking of deinked newspaper. Comparison is made between the selectivity of delignification of kraft pulping at 170° C. and alkaline glycerol pulping at 170° C. and alkaline glycerol pulping at 180° C. The selectivity of delignification expressed as the yield-versus-lignin relationship, exceeds that of kraft pulping.

Figure 3A:
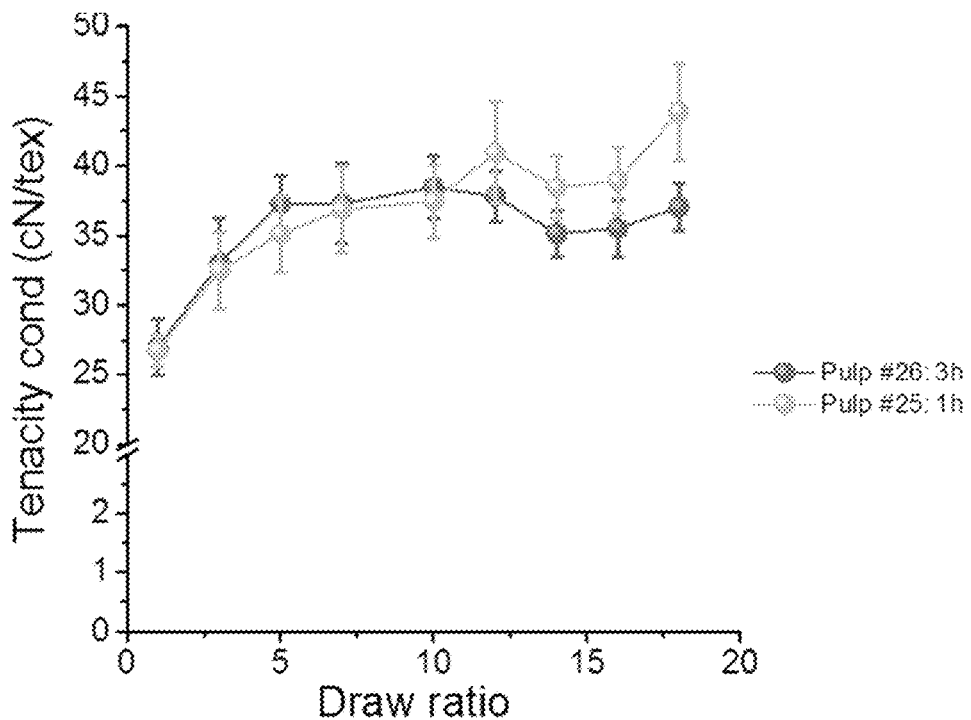
FIGS. 3A-3B show a pair of graphs in which draw ratio is plotted against tenacity of fibers in the conditioned state (left) and draw ratio is plotted against tenacity in the wet state of fibers made from deinked newspaper after cooking in alkaline glycerol.
Figure 3B:
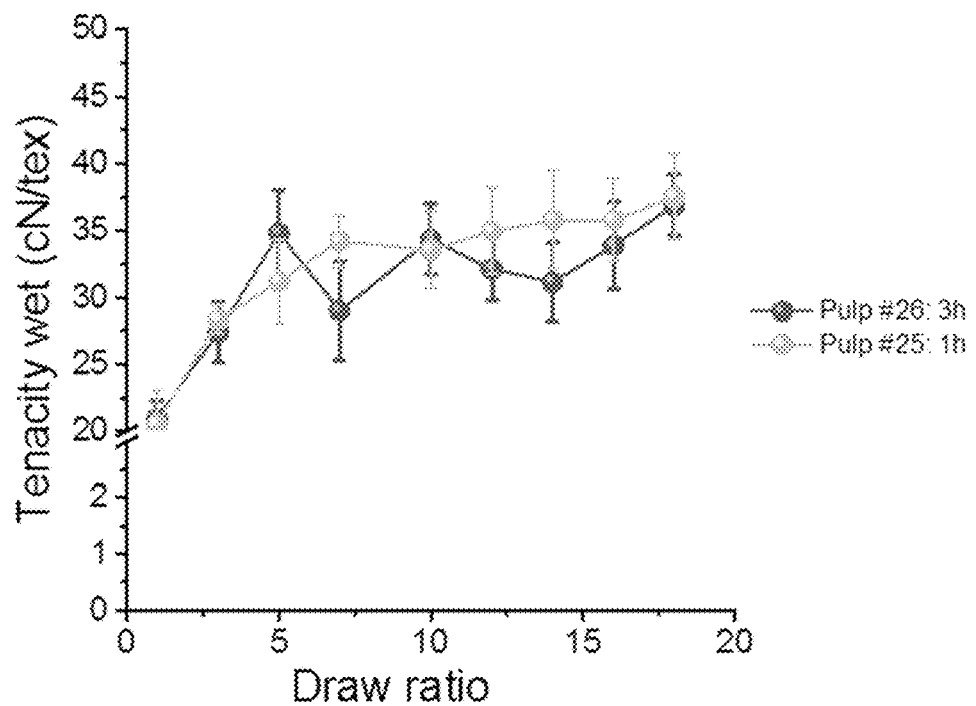

FIGS. 3A-3B show a pair of graphs in which draw ratio is plotted against tenacity of fibers in the conditioned state (left) and draw ratio is plotted against tenacity in the wet state of fibers made from deinked newspaper after cooking in alkaline glycerol. The fibers are provided from alkaline glycerol treated deinked newspaper cooked at 170° C. for 3 hours (pulp #26) and from alkaline glycerol treated deinked newspaper cooked at 180° C. for 1 hour (pulp #25). The tensile strengths of the fibers in both dry (or conditioned) state and wet state are remarkably high As mentioned above, embodiments relate to a process for the conversion of cellulosic waste material into a recycled cellulose product comprising the steps of cooking the waste material in a cooking liquor to remove lignin from the waste material and provide a delignified pulp, dissolving the delignified pulp in an ionic liquid to provide a spinning dope suitable for dry jet-wet spinning, and subjecting the spinning dope to a further processing step to provide a recycled cellulose product, said further step selected from the group of spinning cellulose fibers for use in textiles from the solution, extruding a film product for use in packaging, regenerating the dope as a hydrogel and regenerating the dope as an aerogel. For the purposes of present embodiments a spinning dope is a cellulose solution made by dissolving cellulose or cellulose-rich lignocellulose comprising viscoelastic properties suitable for stretching/spinning.

In an embodiment the cellulosic waste material is derived from mechanical pulp. The amount of mechanical pulp derived cellulosic waste material produced annually is immense and continues to rise, providing an inexpensive but valuable resource that can be recycled by means of embodiments. Taking mechanical pulp derived cellulosic waste material and subjecting it to embodiments of the invention increases the value of the material almost thirty fold, e.g. The typical value of recycled newspaper is approximately 100€ per ton whereas the value of recycled cellulose fibres suitable e.g. for use in the textiles industry are valued at approximately 2500 € or even approximately 3000 € per ton. In the present context, waste materials refers not only to post-consumer recyclable substrates such as newspaper and the like but also to pre-consumer substrates which are waste products generated in industrial processes such as off-cuts in the printing industry and other such paper and wood-like products. In one embodiment the recycled cellulose fibres are obtained, for example, from industry as "pre-consumer recyclables" These recyclables are waste generated in industrial processes, for example from the production of consumer products which have been collected before the products are used. In one embodiment the cellulosic waste material is selected from the group of newspaper, newspaper inserts, directories, such as telephone directories, books, e.g. paperback books, magazines, catalogues, coupons, posters and a mixture thereof. Each of these waste materials is readily available as described above.

In one embodiment the cooking liquor comprises alkaline glycerol. It has been found that pulping the cellulosic waste material in a cooking liquor comprising alkaline glycerol provides a pulp that has been delignified to such an extent that it is suitable for providing a spinning dope. Table 1 below show the results of preliminary alkaline glycerol cooking trials of deinked newspaper. In the cooking trial the cooking liquor had a liquid to solid ratio of 11.3:1 and a glycerol to alkaline to deinked newspaper ratio of 10:1.25:1. As can be seen from Table 1, the lignin content was decreased from 28.0% in the raw material to as little as 3.1% when cooked for 3 hours at 180 degrees.

Group one metal hydroxides are suitable as the alkaline component in the cooking liquor. In one embodiment the alkaline component of the alkaline glycerol is selected from KOH and NaOH. In a preferred embodiment, the alkaline component of the alkaline glycerol is NaOH.

The liquid to solid ratio in the pulping process is optimised to delignify the waste material to the highest possible extent while maintaining a high yield, for example a yield of 50%$_{odw}$ or higher is acceptable provided that the total lignin remaining in the pulp is 15%$_{odp}$ or less, preferably 13.2%$_{odp}$ or less. Thus, in an embodiment the alkaline glycerol and the cellulosic material have a liquid to solid ratio of 2 to 15, preferably 3 to 6.

Replacing water in the cooking liquor with glycerol allows the use of temperatures that would normally cause alkaline hydrolysis of cellulose, i.e. temperatures of 140° C. and above. The replacement of water with glycerol promotes delignification and allows the use of a higher temperature to enhance the efficiency of delignification while keeping cellulose depolymerisation at a moderate level. In an embodiment the cooking is carried out at a temperature in the range of 160° C. to 200° C., preferably at a temperature in the range of 170° C. to 180° C., suitably at a temperature of 170° C. or 180° C.

Cooking time is also directly correlated to efficiency of delignification. In an embodiment the cooking is carried out for a period of 30 minutes to 300 minutes, preferably for a period of 60 to 180 minutes, particularly for a period of 60 minutes or 120 minutes or 180 minutes. Cooking for the specified periods provides efficient delignification when combined with cooking at the temperatures described above.

The alkaline content in the liquor can be adjusted according to requirements, such as adjusting to increase degree of delignification and/or adjusting e.g. until the pretreated thermomechanical pulp or newsprint is completely soluble in the solvent. In an embodiment, the alkaline content of the liquor comprises 2 to 20 wt % of the liquid, preferably between 5 and 10 wt % of the liquid.

In embodiments the process provides a delignified pulp, which is dissolved in an ionic liquid to provide a spinning dope. The amount of lignin remaining in the delignified pulp has an effect on the spinnability of the spinning dope in a lyocell spinning process. Optimally the delignified pulp comprises 15 wt % or less lignin. In one embodiment the delignified pulp comprises 1 to 15 wt % lignin, preferably from 3.1 to 13.21 wt % lignin, suitably 3.1, 4.6, 6.1, 4.27 6.02 or 13.21 wt % lignin.

As described in embodiments above the delignified pulp is dissolved in an ionic liquid. In one embodiment the ionic liquid is a superbase-based ionic liquid. In a further embodiment the ionic liquid is selected from the group consisting of [DBNH][OAc] and [MTBDH][OAC]. Dissolution of the delignified pulp in such ionic liquids provides a spinnable dope.

The substrates can be subjected to an acid treatment after the cooking process to remove the ash content. In an embodiment the spinning dope in solution has an ash content in the range of 0.05 wt % to 5 wt %, preferably 0.5-3 wt %.

The viscosity of the pretreated, or delignified pulp has a viscosity that may vary within certain parameters. In an embodiment the delignified pulp has a viscosity in the range of 250-700 mL/g, preferably 400-500 mL/g and a residual lignin content of 0-15 wt %, preferably 5-10 wt %.

In one embodiment the chemical pretreated newspaper, i.e. the pretreated or delignified pulp (general: wood-like lignocellulosic substrates) having the ash content described above is dissolved in a superbase-based ionic liquid, preferably [DBNH][OAc] and [MTBDH][OAc] to generate a spinnable dope. The generated spinnable dope has various rheological characteristics.

In on embodiment the spinning dope has a zero-shear viscosity between 10,000 and 60,000 Pa·s, preferably 20,000-40,000 Pa·s. In a further embodiment the spinning dope has a zero-shear viscosity in the range of 10,000 to 60,000 Pa·s, preferably 20,000 to 40,000 Pa·s. In an embodiment the spinning dope has a cross-over point (COP) having an angular frequency between 0.2 and 5 s$^{-1}$, preferably 0.5-2 s$^{-1}$. In a further embodiment the spinning dope has a COP having an angular frequency in the range of 0.2 to 5 s$^{-1}$, preferably 0.5 to 2 s$^{-1}$. In a suitable embodiment the spinning dope has a cross-over point (COP) having a dynamic modulus between 1000 and 7000 Pa, preferably 2000-5000 Pa. In a further embodiment the spinning dope has a cross-over point (COP) having a dynamic modulus in the range of 1000 to 7000 Pa, preferably 2000 to 5000 Pa.

In one embodiment the spinning dope is used to spin fibers. In one embodiment the spinning process is the Ioncell-F process, see published references. Spun fibers produced by embodiments have properties rendering the fibers suitable for use in e.g. the textiles industry. In one embodiment the fibers have a titer in the range of 0.5 to 5 dtex, preferably 0.8 to 1.3 dtex. In a further embodiment the fibers have a titer between 0.5 and 5 dtex, preferably 0.8-1.3 dtex. In another embodiment the fibers have conditioned tenacities >35 cN/tex, preferably >40 cN/tex. In one embodiment the fibers have a ratio of wet-to dry tenacity of >0.7, preferably >0.85.

After pretreatment, residual non-carbohydrate fractions are available for further use. In one embodiment the residual non-carbohydrate fractions in the fiber, especially the lignin fraction, can serve as a natural dye.

As described above fibers produced by embodiments may be used in various applications. In one embodiment the fibers are used for the preparation of a fiber product. In a further embodiment the fiber product is selected from the group consisting of textiles and nonwovens. The fibers are also suitable for use in technical applications with special emphasis on the use a precursor fiber for carbon fibers. Thus, in an embodiment the fiber product is a precursor fiber for carbon fibers.

The generated spinning dope can also be extruded to film products used in packaging, coating applications, membranes and separators in batteries. In an embodiment a film product selected from the group consisting of packaging, a coating, a membrane and a separator in batteries produced by embodiments of the method is provided.

Similarly, in a further embodiment a hydrogel produced by embodiments of the method is provided. In one more embodiment an aerogel produced by embodiments of the method is provided.

Examples

Alkaline glycerol cooking of deinked newspaper (Helsingin Sanomat) was carried out by using slightly modified conditions as reported by Hundt et al. (Hundt et al., 2013b). In preliminary trials, comprising two short cooking series with time steps of 1, 2 and 3 h at 170° C. and 180° C., respectively the efficiency and selectivity of lignin removal was investigated. The results are summarized in Table 1.

TABLE 1

Results of preliminary alkaline glycerol cooking trials of deinked newspaper (DNP). Constant conditions: L:S = 11.3:1. Glycerol:KOH:DNP = 10:1.25:1 (w/w)*

| # | Temp ° C. | Time min | Yield % odw | Lignin** % odp | Kappa | AX % odp | GM % odp | Viscosity mL/g undelignified |
|---|---|---|---|---|---|---|---|---|
|  |  |  | 100 | 28.0 |  | 8.1 | 17.4 |  |
| 19 | 180 | 60 | 60.2 | 6.1 | 20.1 | 10.2 | 9.4 | 488 |
| 20 | 180 | 120 | 52.3 | 4.6 | 10.2 | 9.7 | 8.7 | 310 |
| 21 | 180 | 180 | 50.1 | 3.1 | 7.9 | 10.1 | 8.8 | 260 |
| 22 | 170 | 60 | 68.1 | 13.2 | 56.8 | 9.7 | 8.1 | 563 |
| 23 | 170 | 120 | 58.4 | 6.0 | 24.0 | 10.6 | 9.3 | 550 |
| 24 | 170 | 180 | 56.1 | 4.3 | 15.1 | 10.6 | 9.2 | 469 |

*slightly modified as compared to the conditions proposed by Hundt et al. (Hundt et al., 2013b): 13.3:1.33:1
**Total lignin = KL + ASL (klason lignin + acid soluble lignin)
AX = arabinoxylan,
GM = glucomannan Alkaline glycerol pulping proved to be very efficient and selective. In contrast to acidic organosolv treatments, the cellulose DP remained in an acceptable range while the delignification reached very high levels. The preservation of the molecular mass during the alkaline glycerol fractionation process is confirmed by GPC measurements shown in FIG. 1.

The GPC measurements reveal relatively moderate scissions of the long chains accumulating in the average molecular weight range (Log MM~5) while the remaining hemicelluloses maintain their molecular mass as could be expected by the dominating beta elimination reactions as occurring during alkaline treatments at elevated temperatures.

The selectivity of delignification, expressed as the yield-versus-lignin relationship, exceeded that of kraft pulping as shown in FIG. 2.

The results of the preliminary tests (Table 1) indicated that alkaline glycerol pulping of deinked newspaper could adjust both the desired lignin content (<8 wt %) and viscosity range (450±50 mL/g) in only one step. This prompted us to select two conditions for alkaline glycerol cooking for the main trials, one at 180° C. and one at 170° C., to prepare pulps directly suitable for dry jet-wet spinning in a solution of [DBNH][OAc].

TABLE 2

Results of the main alkaline glycerol cooking trials of deinked newspaper (DNP). Constant conditions: L:S = 11.3:1. Glycerol:KOH:DNP = 10:1.25:1 (w/w)*

| # | Temp °C. | Time min | Yield % odw | Lignin** % odp | Kappa | AX % odp | GM % odp | Viscosity mL/g undelignified |
|---|---|---|---|---|---|---|---|---|
|   |   |   | 100 | 28.0 |   | 8.1 | 17.4 |   |
| 25 | 180 | 60 | 60.6 | 6.1 | 17.4 | 10.7 | 9.3 | 508 |
| 26 | 170 | 180 | 57.8 | 4.3 | 14.4 | 10.8 | 8.8 | 443 |

*slightly modifed as compared to the conditions proposed by Hundt et al. (Hundt et al., 2013b): 13.3:1.33:1
**Total lignin = KL + ASL (klason lignin + acid soluble lignin)
AX = arabinoxylan,
GM = glucomannan The production of pulps from deinked newspaper for the spinning trials in two bigger batches was successful and the target properties in terms of lignin content and viscosity were well achieved as seen in table 2. Solutions from both pulps in [DBNH][OAc] were prepared for spinning. Thereby, the concentration of pulp #25 in the ionic liquid was reduced from 13 to 12 wt % owing to its slightly higher pulp viscosity as compared to pulp #26. The key rheological properties of the dopes at spinning temperature are listed in Table 3. The zero-shear viscosity of the cellulose solutions is well within the range of spinnable dope while both the angular frequency of COP and the dynamic modulus of COP are slightly lower than has been determined for optimal spinning (0.8-1.5 s-1 and 3000-6000 Pa, respectively) (Michud et al., 2015).

TABLE 3

Rheological properties of spinning dopes prepared from pulps from deinked newspaper after cooking in alkaline glycerol and [DBNH][OAc] as the solvent at spinning conditions.

| # | Polymer-concentration wt % | Temperature spinning dope °C. | $\eta_0$ Pa · s | $\omega$ (COP) $s^{-1}$ | G Pa |
|---|---|---|---|---|---|
| 25 | 12.0 | 74 | 30 000 | 0.53 | 2390 |
| 26 | 13.0 | 76 | 34 790 | 0.56 | 2832 |

Nevertheless, the spinning performance was excellent, partly exceeding that of dopes prepared from standard dissolving pulps. In both cases a draw ratio of 18 was easily possible resulting in microfibers of very good mechanical properties. Most remarkable is the stable spinning behavior without any spinning defects over a long period of time.

As demonstrated in FIGS. 3A-3B, the tensile strengths of the fibers in both dry and wet state are remarkably high, especially when considering the high hemicellulose content and when comparing with the tenacities of fibers made from deinked newspaper which have been pretreated by kraft cooking (Table 4). The higher tenacities can be explained by a better orientation of the cellulose molecules along the chain axis both in ordered and non-ordered domains. The development of the tenacities as a function of the draw ratio is quite comparable for both pulps. However, while the conditioned tenacity of the fibers made from the pulp of lower viscosity (#26) levels off at a DR of 7-10, it continues to grow up to the highest DR in case of the fibers prepared from the pulp with the higher viscosity. Even though the solution viscosity is even slightly lower for the dope prepared from the higher viscosity pulp due to a lower concentration in the dope (Table 3), the longer chains continue to align along the chain axis even at very high stretch ratios.

Table 5 summarizes the fiber properties obtained from the highest DRs. As mentioned before, the tenacities are remarkably high for fibers consisting of less than 75% of cellulose.

TABLE 5

Results from dry-wet jet spinning of dopes prepared from deinked newspapers treated by alkaline glycerol pulping (details, see table 7). Constant conditions: 200 hole spinneret with a hole diameter of 100 μm, extrusion velocity 5.5 mL/min, 74-76° C. spinning temperature, 10° C. spin bath temperature.

| # | Polymer-concentration wt % | Temperature spinning dope ° C. | $DR_{max}$ | Titer dtex | $F_{cond}$ cN/tex | $\varepsilon_{cond}$ % | $F_{wet}$ cN/tex | $\varepsilon_{wet}$ % |
|---|---|---|---|---|---|---|---|---|
| 25 | 12.0 | 74 | 18 | 0.8 ± 0.1 | 43.9 ± 3.4 | 8.0 ± 0.6 | 37.5 ± 3.2 | 8.5 ± 1.2 |
| 26 | 13.0 | 76 | 18 | 0.9 ± 0.1 | 37.0 ± 1.7 | 8.7 ± 0.9 | 36.9 ± 2.3 | 9.6 ± 0.8 |

Comparative Examples

Prior to dissolution the waste newspaper was deinked and shredded. First attempts to dissolve the pretreated newspaper in the ionic liquid, 1.5-diazabicyclo[4.3.0]non-5-enium acetate ([DBNH][OAc]) using the IONCELL-F process (Hummel et al., 2015) were not successful probably due to an intimate interaction between the lignin and the polysaccharides which prevented the efficient solvation of the polymers. The dissolution trials resulted in the generation of a strong gel.

From this observation we concluded that the lignin content has to be reduced to allow a complete dissolution in [DBNH][OAc]. At first, kraft cooking was applied in a series of different H-factors to remove the lignin content to an extent until a spinnable dope of the residue could be prepared. The results are summarized in Table 6.

TABLE 6

Kraft cooking of deinked newspaper. Constant conditions: L:S = 10:1, EA-charge = 20% odw; sulfidity = 40%.

| # | H-factor | Yield % odw | Lignin % odp | AX % odp | GM % odp | Ash * % odp | Viscosity mL/g | Spinnable Dope |
|---|---|---|---|---|---|---|---|---|
|  | Untreated |  |  |  | 16.6 | 9.4 | n.m. |  |
|  | Deinked | 100.0 | 28.0 | 8.1 | 17.4 | 5.0 | n.m. |  |
| 1 | 25 | 80.1 | 28.3 | 7.8 | 8.2 | 3.0 | 691 | no |
| 2 | 50 | 79.5 | 27.4 | 8.1 | 8.2 | 2.5 | 829 | no |
| 3 | 500 | 69.6 | 17.2 | 7.8 | 8.1 | 3.7 | 858 | no |
| 4 | 1000 | 66.8 | 14.8 | 7.9 | 8.0 | 3.7 | 754 | Bad $DR_{max}$ = 5.3 |
| 5 | 1500 | 61.2 | 11.8 | 7.8 | 8.3 | 3.8 | 727 | Good $DR_{max}$ = 10.6 |

$DR_{max} = \text{maximum draw ratio} = \dfrac{v_{take-up}}{v_{extrusion}}$

* An acid treatment could remove the ash content to levels <1%

The intrinsic viscosities (DP) of the pulps after cooking were too high for their direct use in the spinning process. To avoid any water and energy consuming chemical treatment, the pulps were irradiated as dry sheets with high energy electron beams (10 MeV) to adjust the intrinsic viscosity to the target value of 450±40 mL/g (DPv=1050±120). As shown in Table 7, a dosage of 10 kGy (1 MRad) was appropriate to achieve the target DP of the pulps treated with the three highest H-factors. Even though the DP of the H-factor-500 pulp was very close to the target value, the prepared solution in [DBNH][OAc] was not spinnable. The same also applies to the H-factor-1000 pulp which was spinnable, but breakages started to occur at draw ratios around 5, thus preventing higher draw ratios.

TABLE 7

Electron beam irradiation (EBeam treatment) of deinked newspapers treated by Kraft pulping with three different H-factors levels. Constant conditions: L:S = 10:1, EA-charge = 20% odw; sulfidity = 40%.

| # | H-factor | EBeam kGy | Viscosity mL/g before | Viscosity mL/g after | Chain scission (S) x10$^3$ | G-value |
|---|---|---|---|---|---|---|
| 3 | 500 | 10 | 858 | 457 | 0.53 | 3.2 |
| 4 | 1000 | 10 | 754 | 444 | 0.49 | 2.9 |
| 5 | 1500 | 10 | 727 | 404 | 0.53 | 3.2 |

$$S = \frac{10^3}{P_{v,D}} - \frac{10^3}{P_{v,0}}; \text{Chain scissions per } AHG$$

$$G = \frac{S}{R \cdot 0.162 \cdot 1.03};$$

G-value = number of scissions per 100 eV absored energy

Figure 4:
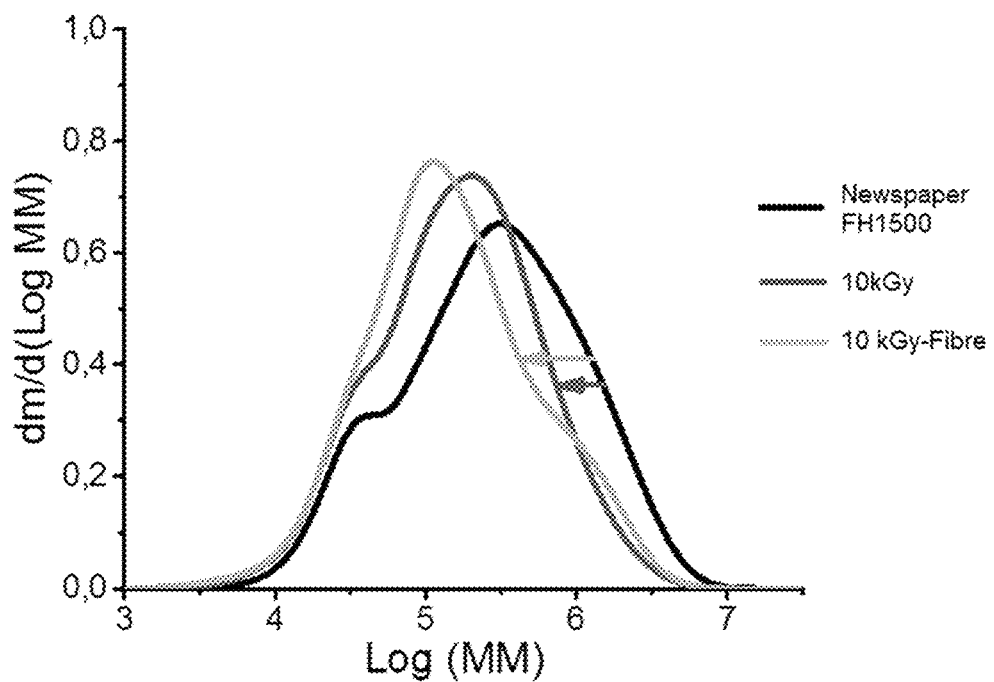
FIGS. 4 to 8 are relevant to comparative examples only.
Figure 5:
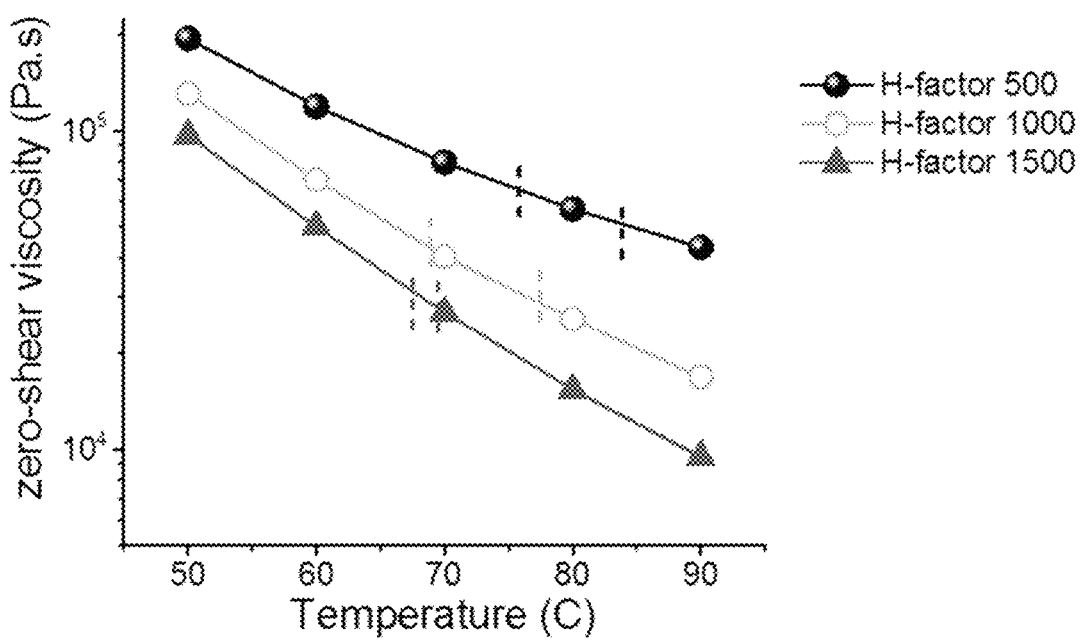

The changes of the molecular mass distribution of the cellulose through EBeam treatment and fiber processing is documented in FIG. 4. The EBeam treatment results in a narrowing of the distribution as shown by the decrease of the polydispersity index (PDI) from 5.9 to 4.5. During the dissolution and regeneration of the EBeam treated pulp, a certain fraction of the long chains are, however, further cleaved which is accompanied with an increase of the PDI to 5.2. It can be speculated that the EBeam treatment causes the generation of carbonylic groups which in turn initiates beta-elimination in the slight alkaline environment at elevated temperature Thus, only the dope prepared from the H1500-pulp revealed acceptable spinnability. The rheological properties of the dopes at the same polymer concentration of 13 wt % are very different. The zero-shear viscosity of the dope as a function of the temperature increases with decreasing intensity (H-factor) during the cooking pretreatment of the substrate as revealed by FIG. 5.

The results confirm the assumption that a too high amount of lignin associated with cellulose leads to more extended molecules or aggregates of molecules (radius of gyration) resulting in higher zero-shear viscosities. The changes in the rheological properties are also reflected in the angular frequency of the cross-over point (COP). With decreasing radius of gyration, the cross-over frequencies shift to higher values (ω=0.18, 0.49 and 0.83 1/s at 70° C. and HF=500, 1000 and 1500, respectively). In conclusion, the elastic properties begin to dominate at higher frequencies for the spinnable dopes which confirms previous observations that good spinnability is ensured, among others, when w of the COP is approximately 0.5-2 s-1 (Sixta et al., 2015).

The dope prepared from the H-factor-1500 pretreated newspaper showed medium-to-good spinnability demonstrated by a maximum draw ratio (DR) of 10.6. However, the fiber properties, as shown in table 3, did not exceed those of good viscose fibers with the exception of the wet tenacity which was better than that of Modal fibers.

TABLE 4

Results from dry-wet jet spinning of dopes prepared from deinked newspapers treated by Kraft pulping with H-factors 1000 and 1500 (details, see table 2). Constant conditions: 13 wt % polymer concentration; 36 hole spinneret with a hole diameter of 100 μm, extrusion velocity 1.6 mL/min, 65-70° C. spinning temperature, 12° C. spin bath temperature. 61.

| # | H-factor | DR$_{max}$ | dtex | Tenacity cN/tex dry | Tenacity cN/tex wet | Elongation cN/tex dry | Elongation cN/tex wet |
|---|---|---|---|---|---|---|---|
| 4 | 1000 | 5.3 | 3.8 | 14.1 | 9.5 | 5.4 | 7.1 |
| 5 | 1500 | 10.6 | 2.3 | 27.4 | 22.7 | 10.0 | 11.7 |

The results clearly document that kraft pulping is not suitable for the pretreatment of old newspapers in a way that they can be processed into high quality man-made cellulose fibers. Even at very high intensity cooking (H-factor 1500) the processability of the dopes prepared from the resulting pulp remains unstable. Furthermore, the kraft process is not adequate in terms of costs and environment-friendliness. Therefore, we have searched for alternative, more "green" processes which could turn the newspapers into a form which can be processed to a spinnable form thereby generating regenerated cellulose fibers of high quality.

We selected two acid catalyzed organosolv processes, first the sulfuric acid catalyzed propylene glycol (PGcat) as proposed by Uraki et al. (Uraki & Sano, 1999) and secondly, the SO2-Ethanol-Water (SEW) process following the work of Iakovlev and van Heiningen (Iakovlev & van Heiningen, 2012; Yamamoto et al., 2014a; Yamamoto et al., 2014b). Both processes have been used for the fractionation of highly resistant softwood species, partly even containing fractions of bark.

Already the kraft pulping trials on deinked newspaper confirmed its high resistance towards delignification. Softwood TMP has been used as a model substrate for both the PGcat and SEW cooking trials because it is the raw material of newspaper production. Surprisingly, both processes led to very strong depolymerization of cellulose, partly even reaching the level-off-DP of cellulose. Table 7 reveals the results of PGcat cooking of TMP following the conditions proposed by Uraki et al. (Uraki & Sano, 1999).

TABLE 7

PGcat cooking of TMP. Constant conditions: L:S = 10:1,
95% PG, 3 wt % H2SO4, 170° C.

| # | Time 170° C., min | Yield % odw | Lignin % odp | AX % odp | GM % odp | Viscosity mL/g Delignified* | Viscosity mL/g untreated |
|---|---|---|---|---|---|---|---|
|  | Untreated | 100.0 | 30.4 | 8.0 | 17.1 |  |  |
| 6 | 30 | 76.4 | 23.9 | 5.2 | 20.5 | 139 | 145 |
| 7 | 60 | 72.8 | 18.7 | 4.4 | 20.4 | 127 | 125 |
| 8 | 90 | 67.9 | 14.6 | 3.9 | 19.0 | 104 | 111 |
| 9 | 120 | 62.0 | 11.3 | 1.8 | 16.8 | 91 | 106 |
| 10 | 150 | 56.5 | 9.6 | <1.0 | 10.0 | 85 | 90 |

*Chlorite dignified according to Wise(Wise et al., 1946)

Figure 6:
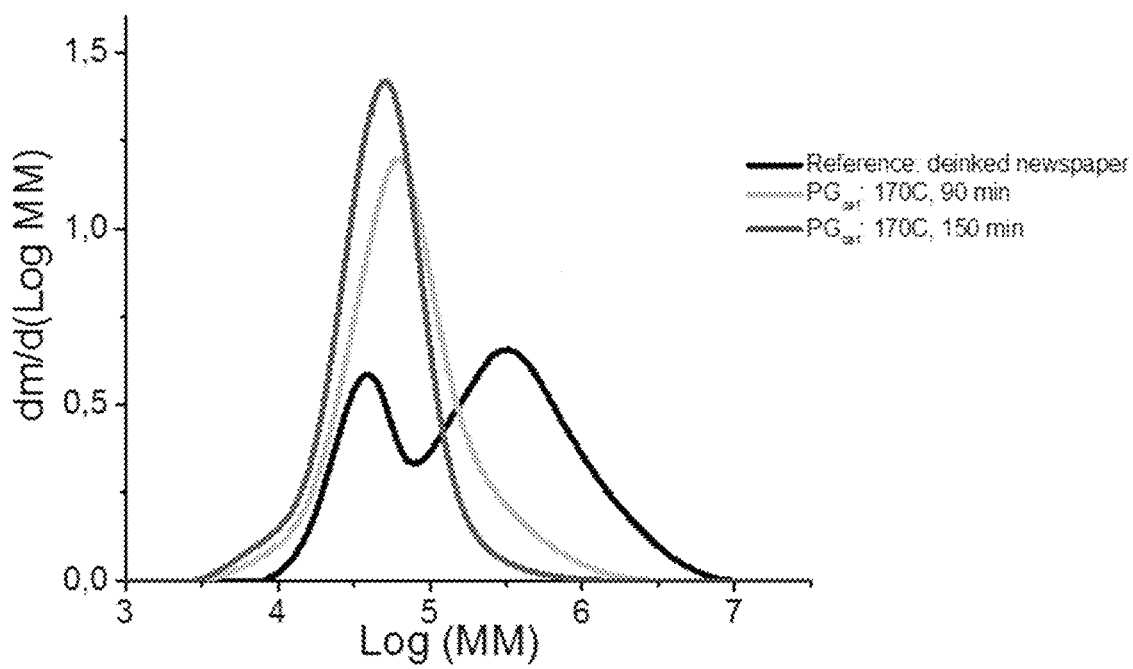

PGcat cooking is clearly unable to remove lignin while preserving the cellulose DP. The high acid concentration is necessary to render lignin water-soluble by severe fragmentation to low molecular weight fractions. However, at the same time xylan is substantially hydrolysed to water-soluble fractions parallel to a severe depolymerization of cellulose approaching the LODP. This highly unselective behavior towards cellulose can be observed in FIG. 6 where the molecular mass distribution of two PGcat treated TMP samples are compared with the molecular mass distribution of deinked newspaper (instead of untreated TMP as the latter was not soluble in LiCl/DMAc). Since a reduction of the acid concentration in PG would lead to a further reduction of its delignification efficiency, PGcat pulping can be excluded as a viable pretreatment method for old newspaper.

More emphasis was taken on the SEW fraction method where both, deinked newspaper and also TMP, were used as a substrate. Further, the cooking temperature was adjusted to two levels, 135° and 150° C., to ensure the most selective conditions for the delignification. The results are summarized in Table 8.

To our big surprise, we observed the same behavior regarding cellulose depolymerization for SEW as for PGcat treatments. Even at relatively mild conditions, 80 min at 135° C., the intrinsic viscosity decreased to a very low level indicating an enhanced cellulose accessibility as compared to a chemical pulp due to a decreased crystallinity (table 5). Indeed, a lower crystallinity index of 64% was determined for spruce TMP compared to 77% for unbleached softwood kraft pulp based on the Segal calculation method from WAXS spectra (Agarwal et al., 2015).

Figure 7:
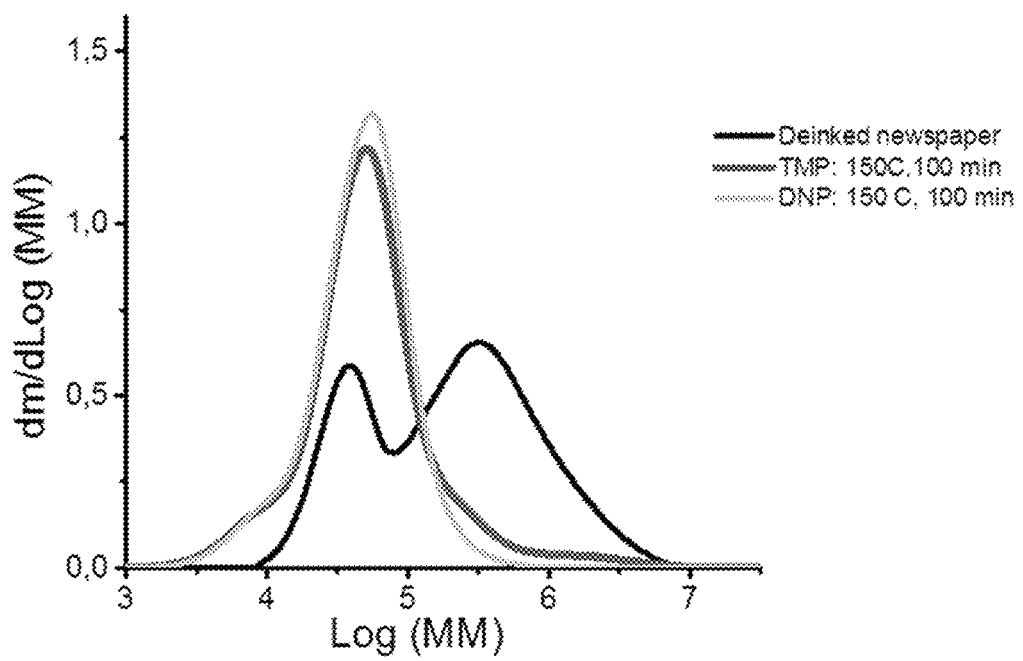

The severe depolymerization of cellulose is highlighted by GPC measurements in FIG. 7 where the drastic effect of the SEW treatments on cellulose chain scission is visible. Both substrates, TMP and deinked newspaper behave similarly.

TABLE 8

SEW cooking of TMP and deinked newspaper. Constant conditions: L:S = 6:1,
cooking acid composition: 12% SO2, 44% ethanol and 44% water.

| # | Substrate | Temp ° C. | Time min | Yield % odw | Lignin* % odp | AX % odp | GM % odp | Viscosity mL/g delignified** | Viscosity mL/g untreated |
|---|---|---|---|---|---|---|---|---|---|
|  | TMP |  |  | 100 | 30.4 | 8.0 | 17.1 |  |  |
| 11 | TMP | 150 | 60 | 58.8 | 9.0 | 4.1 | 21.0 | 106 | 99 |
| 12 | TMP | 150 | 100 | 47.6 | 4.3 | 2.5 | 14.4 | 97 | 94 |
| 13 | TMP | 135 | 80 | 74.9 | 20.1 | 4.5 | 20.6 | 137 | 130 |
| 14 | TMP | 135 | 120 | 63.0 | 11.0 | 4.3 | 21.6 | 113 | 110 |
|  | Deinked NP |  |  | 100 | 28.0 | 8.1 | 17.4 |  |  |
| 15 | Deinked NP | 150 | 20 | 68.9 | 13.0 | 5.9 | 15.8 |  | 129 |
| 16 | Deinked NP | 150 | 40 | 57.9 | 6.7 | 5.6 | 15.3 |  | 118 |
| 17 | Deinked NP | 150 | 60 | 50.4 | 3.8 | 4.9 | 12.1 |  | 102 |
| 18 | Deinked NP | 150 | 100 | 47.1 | 1.9 | 4.1 | 10.2 |  | 103 |

Figure 8:
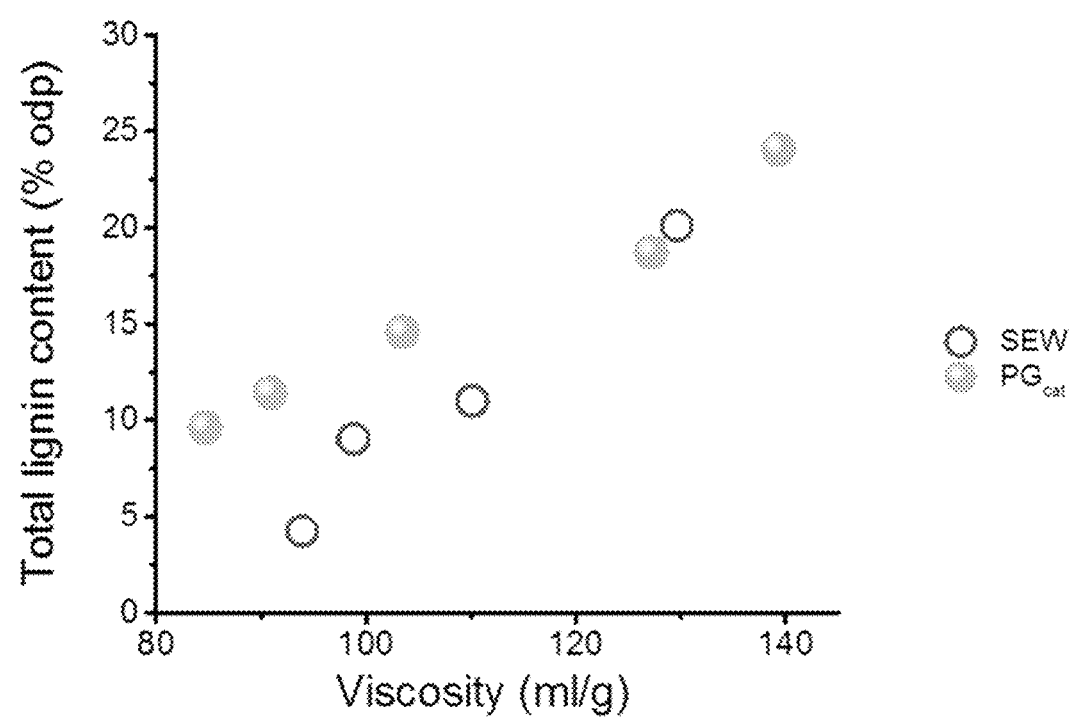

*Klason lignin (KL) and acid-soluble lignin (ASL)
**Chlorite dignified according to Wise(Wise et al., 1946)
AX = arabinoxylan,
GM = glucomannan The delignification selectivity of both organosolv processes can be regarded as comparable to very drastic conditions in which viscosities of less than 120 mL/g are achieved. With further intensifying the conditions, the delignification selectivity of SEW pulping starts to become slightly better than that of PGcat pulping as demonstrated in FIG. 8. However, this is of no practical value since the viscosity is already at a much too low level.

In conclusion, acid organsolv fractionation methods are not suitable for the pretreatment of old newspapers for their use as a raw material for the manufacture of regenerated cellulose fibers. With the obtained results it was clear that acid catalyzed fractionation methods will not lead to an appropriate pretreatment method for old newspaper or TMP pulp.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in advanced recycling strategies using waste materials from everyday life of lowest quality and converting them into value added products such as textile fibers, highly transparent films for coating and packaging, membranes, battery separators, to name a few.

CITATION LIST

Agarwal, U. P., Reiner, R. R., Ralph, S. A. 2015. Cellulose crystallinity of woods, wood pulps and agricultural fibers by FT-Raman spectroscopy. in: 16*th ISWFPC*. Vancouver, Canada, pp. 69-75.

Demirbas, A. 1998. Aqueous glycerol delignification of wood chips and ground wood. *Bioresour. Technol.,* 63 (Copyright (C) 2016 American Chemical Society (ACS). All Rights Reserved), 179-185.

Demirbas, A., Celik, A. 2005. Degradation of poplar and spruce wood chips using alkaline glycerol. *Energy Sources,* 27 (Copyright (C) 2016 American Chemical Society (ACS). All Rights Reserved), 1073-1084.

Firgo, H., Eichinger, D., Eibl, M. 1996. Molding or spinning of recycled cellulose and/or cellulose from annual plants, Lenzing Aktiengesellschaft, Austria. pp. 17 pp.

Holik, H. 2006. *Handbook of Paper and Board.* Wiley-VCH Verlag GmbH & Co. KGaA.

Hummel, M., Michud, A., Tanttu, M., Asaadi, S., Hauru, L., Parviainen, A., King, A., Kilpelainen, I., Sixta, H. 2015. Ionic liquids for the production of man-made cellulosic fibers—opportunities and challenges. *Advances in Polymer Science,* 1-36.

Hundt, M., Engel, N., Schnitzlein, K., Schnitzlein, M. G. 2016. The AlkaPolP process: Fractionation of various lignocelluloses and continuous pulping within an integrated biorefinery concept. *Chem. Eng. Res. Des.,* 107 (Copyright (C) 2016 American Chemical Society (ACS). All Rights Reserved), 13-23.

Hundt, M., Engel, N., Schnitzlein, K., Schnitzlein, M. G. 2014. Combining the effects of pulping severity and alkali concentration to optimize the lignocellulose-based AlkaPolP biorefinery concept. *Bioresour. Technol.,* 166 (Copyright (C) 2016 American Chemical Society (ACS). All Rights Reserved), 411-419.

Hundt, M., Engel, N., Schnitzlein, M. G., Schnitzlein, K. 2013a. Lignocellulose feedstock biorefinery based on alkaline polyol pulping. *Chem. Ing. Tech.,* 85 (Copyright (C) 2016 American Chemical Society (ACS). All Rights Reserved), 758-763.

Hundt, M., Schnitzlein, K., Schnitzlein, M. G. 2013b. Alkaline polyol pulping and enzymatic hydrolysis of softwood: Effect of pulping severity and pulp properties on cellulase activity and overall sugar yield. *Bioresour. Technol.,* 134 (Copyright (C) 2016 American Chemical Society (ACS). All Rights Reserved), 307-315.

Iakovlev, M., van Heiningen, A. 2012. Efficient Fractionation of Spruce by SO2-Ethanol-Water Treatment: Closed Mass Balances for Carbohydrates and Sulfur. *ChemSusChem,* 5 (Copyright (C) 2016 American Chemical Society (ACS). All Rights Reserved), 1625-1637, S1625/1-S1625/4.

Ma, Y., Hummel, M., Maattanen, M., Sarkilahti, A., Harlin, A., Sixta, H. 2016. Upcycling of waste paper and cardboard to textiles. *Green Chem.,* 18 (Copyright (C) 2016 American Chemical Society (ACS). All Rights Reserved), 858-866.

Michud, A., Hummel, M., Sixta, H. 2015. Influence of molar mass distribution on the final properties of fibers regenerated from cellulose dissolved in ionic liquid by dry jet wet spinning. *Polymer,* 75 (Copyright (C) 2016 American Chemical Society (ACS). All Rights Reserved), 1-9.

Nieminen, K., Paananen, M., Sixta, H. 2014. Kinetic Model for Carbohydrate Degradation and Dissolution during Kraft Pulping. *Ind. Eng. Chem. Res.*, 53 (Copyright (C) 2016 American Chemical Society (ACS). All Rights Reserved), 11292-11302.

Sixta, H., Michud, A., Hauru, L., Asaadi, S., Ma, Y., King, A. W. T., Kilpelainen, I., Hummel, M. 2015. Ioncell-F: a high-strength regenerated cellulose fiber. *Nord. Pulp Pap. Res. J.*, 30 (Copyright (C) 2016 American Chemical Society (ACS). All Rights Reserved), 43-57.

Uraki, Y., Sano, Y. 1999. Polyhydric alcohol pulping at atmospheric pressure. An effective method for organosolv pulping of softwoods. *Holzforschung*, 53 (Copyright (C) 2016 American Chemical Society (ACS). All Rights Reserved), 411-415.

Wise, L. E., Murphy, M., D'Addieco, A. A. 1946. Chlorite holocellulose, its fractionation and bearing on summative wood analysis and on studies on the hemicelluloses. *Pap. Trade J.*, 122 (Copyright (C) 2016 American Chemical Society (ACS). All Rights Reserved), 35-43.

Yamamoto, M., Iakovlev, M., van Heiningen, A. 2014a. The effect of chemical and physical characteristics of spruce SEW pulps on enzymatic hydrolysis. *Cellulose (Dordrecht, Neth.)*, 21 (Copyright (C) 2016 American Chemical Society (ACS). All Rights Reserved), 3395-3407.

Yamamoto, M., Niskanen, T., Iakovlev, M., Ojamo, H., van Heiningen, A. 2014b. The effect of bark on sulfur dioxide-ethanol-water fractionation and enzymatic hydrolysis of forest biomass. *Bioresour. Technol.*, 167 (Copyright (C) 2016 American Chemical Society (ACS). All Rights Reserved), 390-397.

The invention claimed is:

1. A process for conversion of cellulosic waste material into a recycled cellulose product comprising:
   cooking the cellulosic waste material in a cooking liquor to remove lignin from the cellulosic waste material and provide a delignified pulp,
   dissolving the delignified pulp in an ionic liquid to provide a spinning dope, and
   forming the recycled cellulose product from the spinning dope,
   wherein the cooking liquor comprises alkaline glycerol, and
   wherein the alkyline glycerol comprises a glycerol to alkaline to cellulosic waste material ratio of 10 to 1.25 to 1 by weight.

2. The process according to claim 1, wherein the cellulosic waste material is derived from mechanical pulp.

3. The process according to claim 1, wherein the cellulosic waste material is derived from a member of the group consisting of newspaper, newspaper inserts, directories, books, magazines, catalogues, coupons, posters, and a mixture thereof.

4. The process according to claim 1, wherein the alkaline component of the alkaline glycerol is selected from the group consisting of KOH and NaOH.

5. The process according to claim 1, wherein the cooking is carried out at a temperature in the range of 170° C. to 180° C. for a period of from 60 to 180 minutes.

6. The process according to claim 1, wherein the cooking liquor comprises an alkaline content, and wherein the alkaline content of the cooking liquor comprises 2 to 20 wt % of the cooking liquor.

7. The process according to claim 1, wherein the delignified pulp comprises from 5 to 10 wt % lignin.

8. The process according to claim 1, wherein the ionic liquid is a superbase-based ionic liquid.

9. The process according to claim 1, wherein the ionic liquid is selected from the group consisting of [DBNH][OAc] and [MTBDH][OAc].

10. The process according to claim 1, wherein the delignified pulp is subjected to an acid treatment to remove ash before dissolving in the ionic liquid.

11. The process according to claim 1, wherein the delignified pulp has a viscosity of 250-700 mL/g.

12. The process according to claim 1, wherein the spinning dope has a zero-shear viscosity in the range of 10,000 to 60,000 Pa·s.

13. The process according to claim 1, wherein the spinning dope has a cross-over point having an angular frequency in the range of 0.2 to 5 $s^{-1}$ and a dynamic modulus in the range of 1000 to 7000 Pa.

14. The process of claim 1, wherein said forming step comprises a member selected from the group consisting of:
   spinning cellulose fibers from the spinning dope,
   extruding a film product from the spinning dope,
   regenerating the spinning dope as a hydrogel, and
   regenerating the spinning dope as an aerogel.

* * * * *